Feb. 20, 1962   E. G. HILL ET AL   3,022,115
MOTOR VEHICLE BRAKING SYSTEM AND CONTROL MEANS THEREFOR
Filed July 2, 1959   4 Sheets-Sheet 1

INVENTORS
EDWARD GOVAN HILL
JOHN X. PHILLIPS
BY John F. Phillips
ATTORNEY

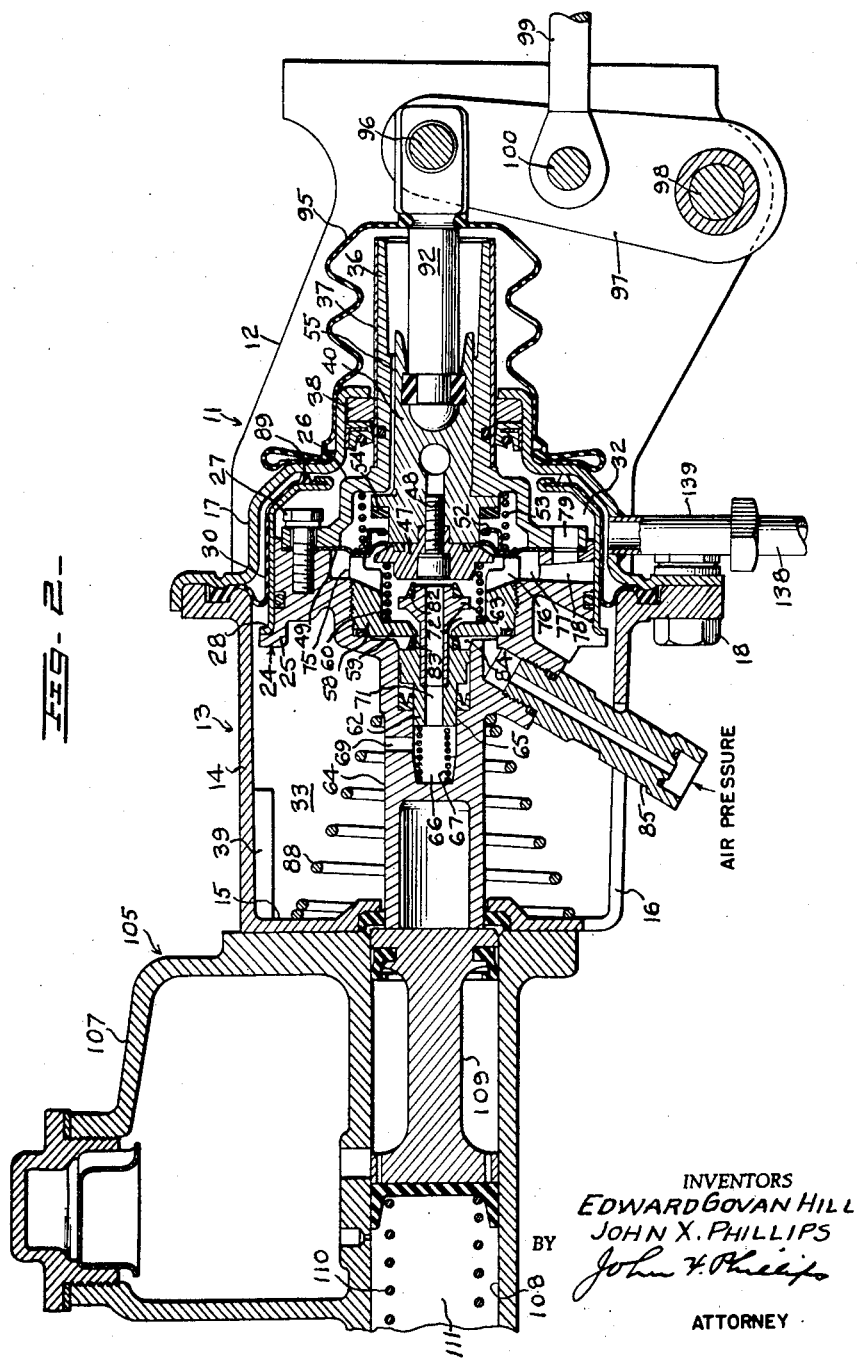

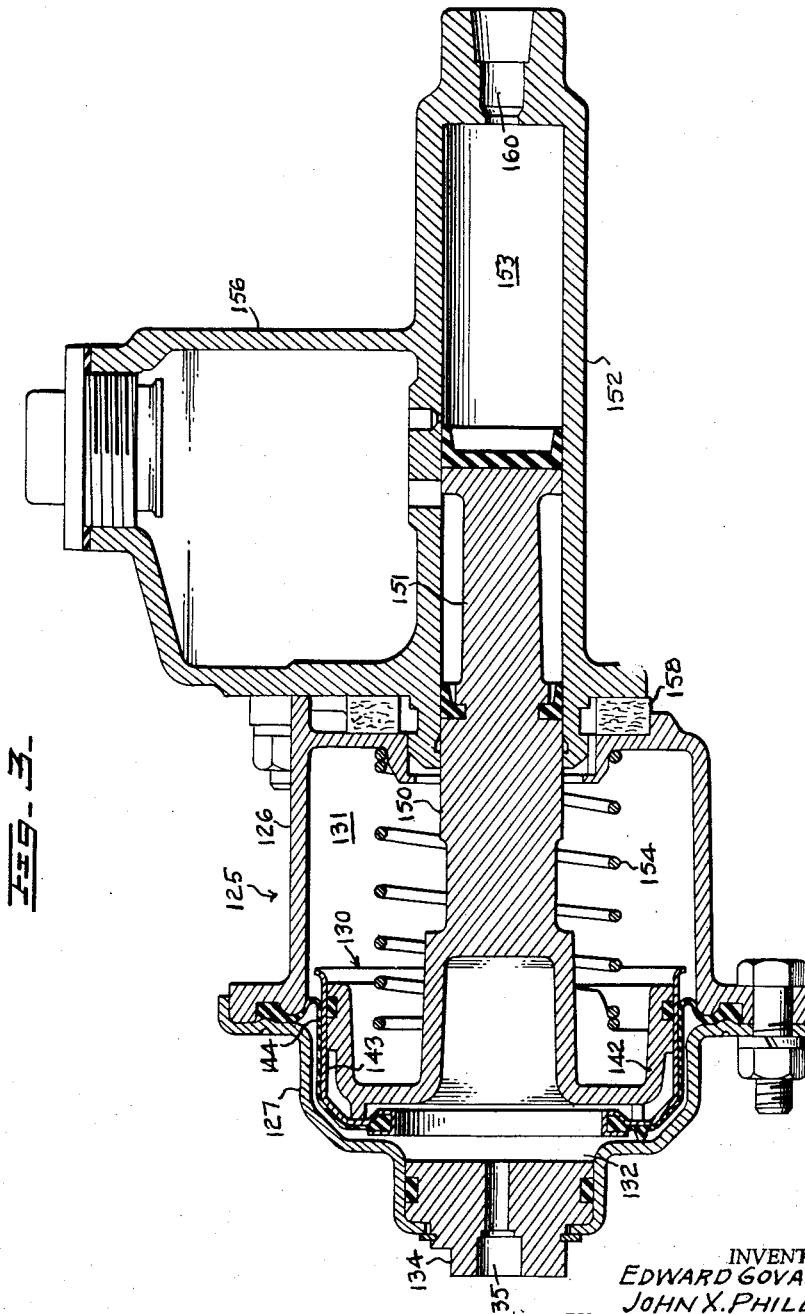

Feb. 20, 1962 E. G. HILL ET AL 3,022,115
MOTOR VEHICLE BRAKING SYSTEM AND CONTROL MEANS THEREFOR
Filed July 2, 1959 4 Sheets-Sheet 4
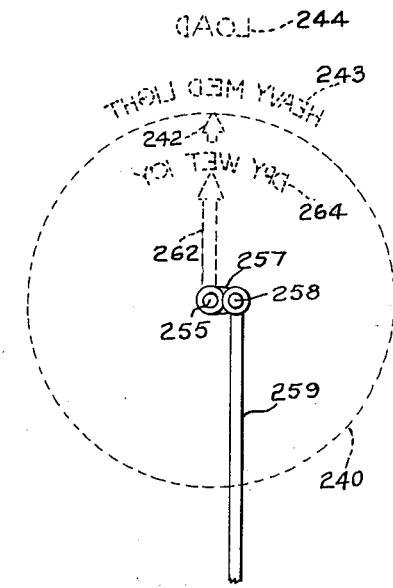
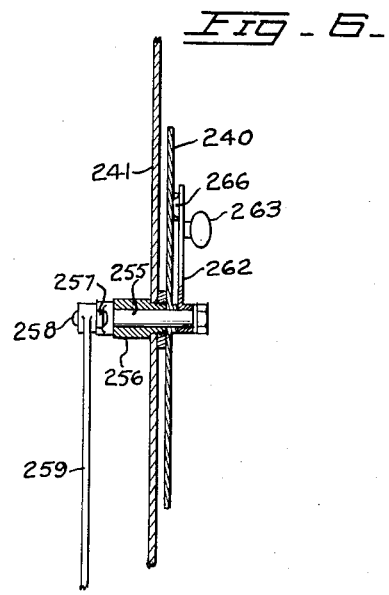
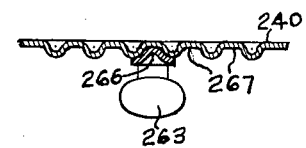
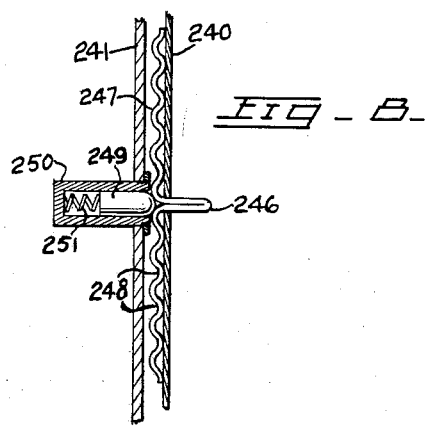
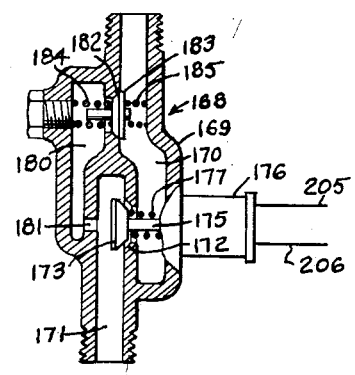
INVENTORS
EDWARD GOVAN HILL
JOHN X. PHILLIPS
BY John X. Phillips
ATTORNEY United States Patent Office 3,022,115
Patented Feb. 20, 1962

3,022,115
MOTOR VEHICLE BRAKING SYSTEM AND
CONTROL MEANS THEREFOR
Edward Govan Hill, Birmingham, Mich., and John X.
Phillips, Vienna, Va., assignors to Kelsey-Hayes Company, Detroit, Mich., a corporation of Delaware
Filed July 2, 1959, Ser. No. 824,614
14 Claims. (Cl. 303—24)

This invention relates to a motor vehicle braking system and control means therefor, and has particular relation to means for variably limiting the application of the rear brakes of a passenger car or truck under various load and road conditions.

In the copending application of Edward Govan Hill, Serial No. 802,349, filed March 27, 1959, there is shown a hydraulic booster brake mechanism for motor vehicles wherein separate master cylinders are operable for supplying pressure fluid to the front and rear brakes of a vehicle, the master cylinder for the front wheels being operated by a booster motor in which the vehicle brake pedal assists the motor in applying the brakes, while the motor for operating the master cylinder for applying the rear brakes is a slave motor operable by pressures supplied to the booster or master motor. The slave motor for applying the rear wheel brakes is not subject to pedal assistance and depends solely on its own power for applying such brakes.

In the copending application of Jeannot G. Ingres, Serial No. 595,493, filed July 2, 1956, now Patent No. 2,922,499, granted January 26, 1960, a system comparable to the system disclosed in the copending application referred to above is disclosed, the system being provided with auxiliary valve means for cutting off the supply of pressure fluid to the rear brake applying motor when the rate of vehicle deceleration increases to a predetermined point, thus minimizing rear brake application to prevent locking and sliding of the rear wheels. Thus the system provides maximum braking by maintaining traction between the rear wheels and the road surface.

In the copending application of Edward Govan Hill, Serial No. 824,613, filed July 2, 1959, now Patent No. 2,953,412, there is disclosed and claimed a system wherein an inertia responsive switch is subject to adjustment upon operation of the vehicle windshield wiper to reduce the rate of vehicle deceleration which will render the auxiliary valve mechanism operative for cutting off the supply of pressure fluid to the rear brake motor. Traction is more difficult to maintain when the highway is wet, and in the system disclosed in the copending application of Jeannot G. Ingres referred to above, the rate of vehicle deceleration is preferably set to cut off pressure fluid to the rear brake motor under dry road conditions and the degree of application of the rear brakes may be too great when the road is wet. In the copending application of Edward Govan Hill, last identified, the changing of the rate of vehicle deceleration at which the auxiliary valve mechanism becomes operative is highly important since it reduces the maximum energization of the rear brake applying motor to a point where traction will be maintained between the rear wheels and the highway surface when it is raining.

An important object of the present invention is to provide a system embodying the characteristics of all of the systems of the copending applications referred to above, and which goes further in determining the rate of vehicle deceleration at which the auxiliary valve mechanism cuts off the supply of fluid to the rear brake motor, the system providing for adjustment of the inertia switch which controls the auxiliary valve mechanism in accordance with the condition of the highway and also in accordance with the degree of loading of the vehicle, which is highly important particularly when the system is used on trucks.

A further object is to provide such a system wherein an adjustment is provided for changing the inclination to the horizontal of the mercury switch used as the inertia responsive means for controlling the auxiliary valve, the adjustment providing for changing the angularity of the mercury switch in accordance with road conditions, and providing also in conjunction therewith means for changing the inclination of the mercury switch in accordance with the loading of the vehicle.

A further object is to provide a system of this character wherein, regardless of the setting of the main adjustment means just referred to, the turning on of the windshield wiper will reduce the angle to the horizontal of the mercury switch, thus automatically reducing the degree of maximum energization of the rear brake motor when the brakes are applied rather suddenly.

A further object is to provide a mercury switch in a system of this character which is pivotally supported at opposite ends, and to provide means for moving either pivotal support in accordance with the means connected thereto, to vary the angularity of the mercury switch to the horizontal.

A further object is to provide an adjustment for controlling the angularity of the mercury switch through movement of a pointer over a dial to change the angularity of the switch, and to provide for movement dial itself, together with the pointer, to provide for adjustment of the angularity of the mercury switch under a different set of conditions.

Other objects and advantages of the invention will become apparent during the course of the following description.

In the drawings I have shown one embodiment of the invention. In this showing:

FIGURE 1 is a diagrammatic view of the system as a whole;

FIGURE 2 is an enlarged fragmentary axial sectional view through the master motor and associated parts through which the front vehicle brakes are applied;

FIGURE 3 is an enlarged axial sectional view through the slave motor and associated master cylinder for applying the rear brakes;

FIGURE 4 is a detail sectional view through a pressure releasing valve;

FIGURE 5 is a rear face view of a portion of the vehicle dash showing a part of the adjusting means for changing the angularity of the inertia operated mercury switch;

FIGURE 6 is an enlarged detail sectional view on line 6—6 of FIGURE 1;

FIGURE 7 is an enlarged fragmentary sectional view on line 7—7 of FIGURE 1;

FIGURE 8 is a similar view on line 8—8 of FIGURE 1; and

FIGURE 9 is a detail section on line 9—9 of FIGURE 1.

Referring to FIGURE 1, the numeral 10 designates a motor vehicle fire wall against the forward face of which is fixed a U-shaped bracket 11 having parallel side walls 12 supporting a master booster motor 13. The motor 13 (FIGURE 2) has a cylindrical forward housing 14 provided with a front end wall 15 longitudinally slotted in the bottom thereof as at 16. The motor 13 further comprises a rear housing 17 bolted to the housing 14 as at 18. Within the motor 13 is a pressure responsive unit indicated as a whole by the numeral 24 and comprising body sections 25 and 26 secured together as at 27. On the outer cylindrical surface of the body section 25 is pressed an annular member 28 extending rearwardly into the housing member 17. The member 28 has its radially inner edge crimped about the inner periphery of a rolling diaphragm 30. This diaphragm has an outer bead clamped between the motor sections 14 and 17, as shown in FIGURE 2. The unit 24 divides the motor to form a variable pressure or control chamber 32 and an atmospheric chamber 33 open to the atmosphere through the slot 16. A rearwardly extending sleeve 36 is formed on the body section 26, and on such sleeve is pressed a stainless steel tube 37 slidable in a combined bearing and sealing unit 38 carried by the rear motor housing 17. An abutment 39 prevents substantial movement of the body section 25 forwardly beyond its normal limit of movement as would occur, for example, if there should be a failure in the forward brake hydraulic lines, as will become apparent.

A manually operable member 40 is axially slidable in the sleeve 36 and has a cap member 47 secured to the forward end thereof by a screw 48. The inner periphery of a diaphragm 49 is clamped between the members 40 and 47, and the outer periphery of such diaphragm is clamped between the body sections 25 and 26. A reaction washer 52 engages the diaphragm 49 and is biased forwardly therewith by a spring 53 to assume the normal position shown in FIGURE 2. The member 40 carries a rubber bumper 54 engageable with the reaction washer 52 upon energization of the motor 13. The sleeve 36 is grooved as at 55 to vent to the atmosphere the chamber in which the spring 53 is arranged.

A nut 58 is threaded on the body section 25 and is provided with an internal flange 59 having an axial opening therethrough. A spring 60 has its ends engaging respectively against the flange 59 and cap 47 to urge the latter toward its normal position shown in FIGURE 2.

A valve unit comprising elements 62 and 63 is slidable axially in the body member 25 and the latter member has a forwardly extending axial portion 64 provided with a bore 65 in which the member 62 is slidable. A chamber 66 is formed in the forward end of the bore 65, and a spring 67 therein biases the valve members toward the right in FIGURE 2. The chamber 66 communicates with the chamber 33 through a port 69, and accordingly the chamber 66 is always in communication with the atmosphere. The valve members 62 and 63 have an axial passage 71 extending entirely therethrough. Such passage communicates at its forward end with the chamber 66 and at its rear end with a control chamber 72.

The nut 58 has a rearwardly extending flange 75 normally engaging the diaphragm 49. This flange is grooved as at 76 to connect the chamber 72 with a radially outer chamber 77, the latter chamber in turn communicating with the motor chamber 32 through passages 78 and 79.

A resilient valve element 82 is carried by the member 63 and projects slightly beyond the rear end thereof. The valve element 82 is normally spaced from, but is engaged with, the cap 47 upon movement of the latter as described below. The member 62 carries a similar resilient valve element 83 normally engaging the flange 59.

A pressure chamber 84 surrounds the valve element 83 and is in fixed communication with a connector 85 movable longitudinally in the slot 16. The connector 85 (FIGURE 1) is connected to one end of a flexible hose 86 to which superatmospheric pressure is supplied as described below. The pressure responsive unit 24 is biased to the right in FIGURE 2 to off position by a return spring 88, and movement of the unit to such position is limited by engagement with the motor housing 17 of an annular bumper 89 formed on the diaphragm 30. A push rod 92 has suitable flexible connection with the member 40, and a boot 95 is connected between the push rod 92 and the motor housing 17. A pivot pin 96 (FIGURES 1 and 2) connects the rod 92 to the upper end of a lever 97, and the lower end of this lever is pivoted as at 98 to the bracket walls 12. A pedal operable push rod 99 is pivoted as at 100 to the lever 97. The rear end of the push rod 99 is pivoted as at 101 to a depending pedal lever 102, operable over and rearwardly of a toe board 103. The broken-line position of the pedal in FIGURE 1 represents the normal maximum movement of the pedal toward the toe board during operation of the motor 13. If a failure should occur in the hydraulic lines to the front brakes, which lines are described below, the pressure responsive unit 24 will meet with no forward resistance and the body section 25 will then come into engagement with the abutment 39 to limit forward movement of the unit 24. Under such conditions, the pedal 102 will be only slightly lower than the broken-line position in FIGURE 1, and under these circumstances, the valve mechanism for the motor 13 is still subject to operation by the brake pedal, thus providing for the controlling of the slave motor to be described.

A conventional master cylinder 105 is secured to the motor wall 15 and comprises a conventional reservoir 107 and a master cylinder bore 108 in which is slidable the usual plunger 109. The rear end of this plunger abuts the axial extension 64 to be actuated thereby. The usual spring 110 biases the plunger 109 rearwardly, and the left-hand end of the bore 108 (FIGURE 2) forms a pressure chamber 111 communicating through lines 112 (FIGURE 1) with conventional front wheel cylinders 113.

The motor 13 in the present instance is super-atmospheric pressure operated, and to supply such pressure, a vehicle engine driven compressor 118 has its outlet piped as at 119 to a reservoir 120. The outlet of the reservoir has the usual pressure regulating valve 121 piped as at 122 to the other end of the flexible hose 86.

A slave motor 125 (FIGURES 1 and 3) is employed for applying the rear brakes. Such motor has a cylindrical body 126 and a cap member 127 divided by a pressure responsive unit 130 to form an atmospheric chamber 131 and a control chamber 132. A fitting 134 in the cap member 127 has an axial passage 135 communicating at one end with the motor chamber 132 and connected at its other end to one end of a pipe 138. The other end of this pipe connects with a fitting 139 communicating with the master motor control chamber 32 as shown in FIGURE 2. The pressure in the motor chamber 32 accordingly will be communicated through the pipe 138 to the slave motor chamber 132 except as such communication may be cut off by an auxiliary valve device described below.

The pressure responsive unit 130 has a preferably die-cast body 142 on which is pressed a shell 143 over which rolls a diaphragm 144. This diaphragm is connected at its inner and outer peripheries to the shell 143 and to the motor casing members 126 and 127.

The body 142 has an axial extension 150 the rear end of which terminates in a master cylinder plunger 151 operating in a master cylinder 152 to generate pressure in a chamber 153. The pressure responsive unit and associated parts are biased to off position by a spring 154. The master cylinder 152 has the usual reservoir 156, and between the master cylinder unit and the motor housing 126 is interposed an air cleaner 158. The chamber 153 has an outlet 160 communicating through lines 162 (FIGURE 1) with conventional rear wheel brake cylinder 163.

An auxiliary valve device 168 is interposed in the pipe 138. This device comprises a cast body 169 (FIGURE 4) having chambers 170 and 171 communicating respectively with the upper and lower ends of the pipe 138, as viewed in FIGURE 1. Communication between these chambers is controlled through a valve seat 172 associated with a valve 173 carried by a stem 175 forming the armature of a solenoid 176. The valve 173 is biased to open position by a spring 177.

The body 169 is also provided with a chamber 180 in fixed communication with the chamber 171 through a port 181. Communication between the chambers 180 and 170 is controlled through a valve seat 182, normally closed by a valve 183. Such valve is engaged on opposite sides by springs 184 and 185 providing a net force lightly biasing the valve 183 to closed position.

In FIGURE 1 there are shown the several associated means for controlling energization of the solenoid 176. A support 190 is provided at opposite ends with vertical guides 191 and 192 in which are vertically slidable flat projections 193 and 194 carried by the ends of a mercury switch 195. Such switch comprises a tube 196 in which is arranged a body of mercury 198, and the ends of the tube 196 are provided with ferrules 199 and 200 from which the respective members 193 and 194 project. The tube 196 is inclined upwardly and forwardly and is provided near its forward end with contacts 202 and 203, the former of which is connected by a wire 205 to one terminal of the solenoid 176. The other terminal of such solenoid is connected by a wire 206 to one terminal of the vehicle battery 207 having its other terminal grounded as at 208. The contact 203 is grounded as at 209.

The ferrules 199 and 200 carry respectively at the tops thereof pivot pins 212 and 213 each of which is adapted to serve as a pivotal support for the tube 196 in accordance with operation of the means to be described below. The side walls of the guide 192 are offset away from each other below the projection 194, as shown in FIGURE 9, to provide space for a wall 214 in which is threaded an adjusting screw 215 to limit downward movement of the adjacent end of the tube 196 under conditions to be described. A tension spring 216 biases the adjacent end of the tube 196 for downward movement.

A windshield wiper motor 220 is provided with a rock shaft 221 to which is attached the wiper arm 222 carrying a conventional wiper blade 223. The motor 220 may be of either the vacuum or electrically operated type, and, if of the vacuum type, will be provided with a vacuum supply line 224 leading to a control housing 225.

The mechanism in the housing 225 is controlled by movement of a rod 228 pivotally connected to a handle lever 229 pivotally supported as at 230. The lever 229 is shown in the off position in FIGURE 1, and movement of the upper end of the lever 229 in the direction of the arrow will start the windshield wiper motor. In accordance with present practice, different speeds of windshield wiper operation may be provided by increasing the movement of the upper end of the lever 229 from the off position.

The lower end of the lever 229 is provided with a laterally extending yoked arm 232 straddling a rod 233 having a head 234 at its upper end normally seating on the yoked arm as shown. The lower end of the rod 233 is connected to the pivot pin 213, and the rod is preferably provided intermediate its ends with means, such as a turn-buckle 236, for adjusting the length of the rod 233 to thus adjust the angularity of the tube 196 to the horizontal when the lever 229 is in normal off position and when other control devices to be described are set for any given condition.

Referring to FIGURES 1 and 5–8, inclusive, the numeral 240 designates a dial mounted adjacent the vehicle instrument panel 241. This dial has an arrow 242 (FIGURES 1 and 5) operable over suitable indicia 243 on the instrument panel. Such indicia may indicate the relative loading of the vehicle such as "Heavy," "Medium," and "Light." Above such indicia the word "Load" may appear as at 244.

At diametrically opposite points, the dial 240 may be provided with finger pieces 246. As shown in FIGURE 8, these finger pieces may be the central bent portions of a metal strip 247 extending circumferentially away from the finger pieces and having their extremities secured, as by spot-welding, to the dial 240. Each strip 247 is undulated, as shown, to provide notches 248 selectively engageable by a spring-pressed detent 249 mounted in a cylindrical body 250 and biased toward the undulations by a spring 251. By engaging the thumb of the right hand with the left-hand finger piece 246 and the forefinger with the other finger piece 246, the dial 240 may be turned in either direction to locate the arrow 242 in the proper position according to the loading of the vehicle.

The dial 240 (FIGURE 6) is rotatable on a shaft 255 which, in itself, is rotatable in a bearing 256 mounted on the forward face of the instrument panel 241. The shaft 255 forwardly of the instrument panel is provided with a crank 257 pivotally connected as at 258 to the upper end of a rod 259. Such rod has its lower end connected to the pivot pin 212.

A pointer 262 is fixed to the shaft 255 rearwardly of the dial 240 and is preferably provided with an operating knob 263 to move it over indicia 264 indicating the condition of the roadway, for example, whether it is dry, wet, or icy. The pointer 262 is preferably formed of thin flexible material and near its free end is stamped to provide an integral detent 266 engageable selectively in notches 267 stamped in the face of the dial 240. Thus the knob 263 may be moved to place the detent in any of the notches 267, the flexibility of the pointer 262 providing for the movement of the detent 266 from one notch to another. It will be apparent that either the turning of the pointer 262 or the turning of the dial 240 will rotate the shaft 255. Such movement of the dial 240 will impart movement to the pointer 262 through engagement of the notches 267 with the detent 266.

*Operation*

Assuming the valve 173 (FIGURE 4) to be open, the master motor 13 and slave motor 125 function as fully described in the copending application of Edward Govan Hill, Serial No. 802,349, referred to above. Depression of the brake pedal 102 operates in the obvious manner to move the member 40 (FIGURE 2) to the left, whereupon the cap 47 engages the element 82 to close communication between the atmospheric passage 71 and the chamber 72. Since this chamber communicates with the motor control chamber 32 through the various ports and passages 76, 77, 78 and 79, the motor chamber 32 will be cut off from the atmosphere. Slight further pedal operation moves the cap 47 further to the left in FIGURE 2 to move the valve bodies 62 and 63, thus opening the valve element 83 and connecting the high pressure chamber 84 to the chamber 72, accordingly raising pressure in the motor chamber 32. The pressure responsive unit 24 now moves to the left in FIGURE 2 to displace fluid from the chamber 111 through lines 112 (FIGURE 1) to the front wheel brake cylinders 113 to apply the front wheel brakes. Pressure in the motor chamber 32 will be communicated through the pipe 138 to the slave motor chamber 132 to actuate the pressure responsive unit 130. This operation moves the plunger 151 to displace fluid from the chamber 153 through lines 162 (FIGURE 1) to the rear wheel brake cylinders 163 to apply the rear vehicle brakes.

The elements of the motor 13 operate in accordance with the disclosure of copending application 802,349, referred to above, to transmit reaction to the brake pedal to provide the latter with "feel." At a given point in the operation of the mechanism, the cap 47 will engage the shoulder of the flange 75, after which pedal transmitted forces will assist the pressure responsive unit 24 in applying the front wheel brakes. Such pedal pressure may be increased after the motor 13 is energized to its maximum extent, and accordingly forces transmitted to the front wheel brakes will be limited only by the ability of the operator to exert force against the brake pedal. However, the slave motor provides the sole power for applying the rear brakes. There is no pedal assistance to the application of the rear brakes and during the normal operation referred to, pressure in the motor chamber 132 will always equal pressure in the chamber 32 of the master motor. The power of the slave motor provides adequate force for applying the rear brakes to the maximum extent needed. For example, the master motor is so designed to provide all of the rear braking force necessary when the vehicle is being driven over a dry highway and, in the case of a truck, when the vehicle is heavily loaded. Under such conditions, therefore, locking and sliding of the rear wheels is minimized, such action being avoided except upon the very substantial and sudden application of the brakes as in a panic stop. This condition is taken care of as described below.

When the brake pedal is released, the spring 60 (FIGURE 2) returns to normal off position the cap 47 and the members connected thereto. The spring 67 thereupon returns the valve elements 82 and 83 to their normal positions shown in FIGURE 2, and the motor chamber 32 will be again connected to the atmosphere. The return spring 88 returns the pressure responsive unit 24 to the normal off position. Atmospheric pressure will also be re-established in the slave motor 125, and accordingly the rear brakes also will be released.

While the principal features of the present invention may be utilized in a passenger vehicle, they are particularly important for use with the braking system of a truck. If the operator suddenly and forcefully depresses the brake pedal for a rapid stop, the rapid initial deceleration of the vehicle will cause the body of mercury 198 (FIGURE 1) to move forwardly in the tube 196 to close a circuit across the contacts 202 and 203. Thus the solenoid 176 will be energized and the valve 173 (FIGURE 4) will be closed. This operation will occur prior to the admission of maximum pressure to the slave motor and will cut off the admission of further air pressure to such motor. Therefore, there can be no further energization of the slave motor 125, but the front wheel brakes may be applied to whatever extent is necessary for the reasons given above. Accordingly, the locking and sliding of the rear wheels will be prevented. The rate of vehicle deceleration necessary to operate the mercury switch 125 will depend upon the inclination of the tube 196, which in turn is dependent upon the setting of the control elements therefor, as described below.

If the solenoid 176 is in operation and the brake pedal is released, an appreciable time lag will occur before the body of mercury 198 will move away from both contacts 202 and 203. Thus there would be a momentary sluggishness, in the absence of the valve 183, in the releasing of the rear brakes, although the front wheel brakes will be immediately released by the return of the master motor valve mechanism to normal position. When the brake pedal is thus released, the master motor chamber 32 will be immediately connected to the atmosphere, and atmospheric pressure will be re-established in the chamber 170 (FIGURE 4). Due to the previous energization of the slave motor, super-atmospheric pressure will be present in the chamber 171 under the conditions referred to. When this condition is established, the pressure release valve 183 will immediately open. The valve 183 being substantially balanced by the springs 184 and 185, atmospheric pressure will be quickly established in the slave motor regardless of any momentary delay in the de-energization of the solenoid 176.

The inclination of the mercury switch tube 196 is controlled by the mechanism shown in FIGURES 1 and 5–8, inclusive. In prior constructions using a mercury tube inertia switch, such tube is pivotally supported on a fixed axis on which it is adapted to tilt, for example as shown in the copending application of Edward Govan Hill, Serial No. 824,613, filed July 2, 1959, now Patent No. 2,953,412, referred to above. In the present installation, the mercury tube is pivotally supported for turning movement on either pivot pin 212 or 213, depending upon the operation of the control mechanism therefor.

Assuming that the vehicle is being driven over a dry highway with the vehicle carrying a medium load, the arrow 242 will be in the position shown in FIGURE 1, while the pointer 262 will be moved to the left of its position shown in FIGURE 1, pointing to the word "Dry." If it should then start to rain and the operator turns on the windshield wiper by pulling rearwardly on the handle lever 229, the yoked arm 232 will move downwardly and the spring 216 will move the left-hand end of the mercury tube 196 downwardly to reduce the angle to the horizontal of the mercury switch 196. Such downward movement is limited by the screw 215 so that any movement of the handle 229 to operate the windshield wiper, even at low speed, will lower the left-hand end of the tube 196. Any further movement of the handle lever 229 simply will release the yoked arm 232 from the head 234 without further affecting the tube 196. Under such conditions, the tube will turn about the pivot pin 212 and the rate of vehicle deceleration necessary to operate the mercury switch will be reduced. Thus the energization of the slave motor 125 will be limited as compared with its energization on a dry road. Therefore the tendency for the rear wheels to lock and slide is further minimized.

If, thereafter, the rain ceases and the windshield wiper is stopped, the rod 233 will be lifted to restore the previous position of the tube 196. The operator then may move the pointer 262 to coincide with the word "Wet" and this operation will turn the crank 257 clockwise to lift the right-hand end of the tube 196, the tube then turning on the pivot pin 213.

If the vehicle is being driven on an icy road, the pointer 262 may be turned clockwise in FIGURE 1 to a position in the last notch 267. Such operation will further lift the right-hand end of the tube 196, thus further reducing the angle to the horizontal of the tube 196 and correspondingly reducing the rate of vehicle deceleration necessary to cut off the admission of pressure fluid to the slave motor 125.

The foregoing operations of adjusting the pointer 262 take place with the dial 240 remaining stationary, being held against movement by the detent 249 (FIGURE 8). The spring 251 will be sufficiently strong to prevent turning movement of the dial 240 when the pointer 262 is turned. If the vehicle is being driven over a wet road with a light load, the pointer 262 will be left in the position shown in FIGURE 1. By placing the thumb of the right hand beneath the left-hand finger piece 246 and the forefinger above the right-hand finger piece 246, the operator may turn the dial 240 so that the arrow 242 points to the word "Light." This operation turns the pointer 262 with the dial 240 and lifts the right-hand end of the tube 196 while such tube pivots on the pin 213.

If the vehicle, for example a truck, is traveling with a heavy load on a dry road, the pointer 262 will be turned to "Dry" and the dial 240 will be turned counterclockwise so that the arrow 242 points to "Heavy." Each of these two operations has the effect of lowering the right-hand end of the tube 196 and places this tube in its position of maximum inclination to the horizontal. Thus it requires a substantially higher degree of vehicle deceleration to operate the mercury switch. Under such conditions, the rear vehicle wheels will accept a higher degree of braking action without locking and sliding. Under ordinary braking conditions, the solenoid 176 will not be energized. Under the conditions now being considered, however, the operator may make a "panic" stop, in which case the mercury switch will operate to close the valve 173 (FIGURE 4) with the slave motor 125 substantially energized but below the point of sudden energization which would result in the locking of the rear vehicle wheels.

In view of the foregoing, it will be apparent that the present system provides for a substantial variation in the rate of vehicle deceleration which will close the solenoid operated valve, all conditions of driving both as to road surface and load being taken into account. This is highly important, particularly in the operation of trucks, to prevent the locking and sliding of the rear wheels. Under all of the conditions referred to, therefore, locking and sliding of the rear wheels can be prevented while providing under all such conditions the maximum degree of sudden braking which the rear wheels can accept. With both the windshield wiper and the dial mechanism employed in this system, either of the pivot pins 212 or 213 can serve as the pivot axis for the tube 196. The length of the rod 233 and accordingly the normal inclination of the tube 196 for any given setting of the dial mechanism may be provided by operating the turnbuckle 236. The maximum extent of the lowering of the left-hand end of the tube 196 when the windshield wiper is turned on may be determined by adjustment of the screw 215.

It is to be understood that the form of the invention shown and described is to be taken as a preferred example of the same and that various changes in the shape, size, and arrangement of the parts may be made as do not depart from the spirit of the invention or the scope of the appended claims.

We claim:

1. A motor vehicle braking system comprising a fluid pressure motor having a pressure responsive unit, a master cylinder having a plunger connected to said pressure responsive unit for displacing fluid under pressure to wheel cylinders of the vehicle, a control valve mechanism for said motor having connection with sources of relatively high and low pressures, means including a fluid line connecting said valve mechanism to said motor, a normally open valve in said line, a solenoid connected to said valve and energizable to close it, a circuit for said solenoid including an inertia switch normally inclined upwardly and forwardly of the vehicle and having an inertia responsive conducting body therein movable forwardly in response to vehicle deceleration for closing said circuit, a pair of supports for said inertia switch at spaced points therealong, means for moving one of said supports vertically while the other support remains stationary, to change the inclination of said switch from the horizontal, and means for moving said other support vertically while said one support remains stationary, to change the inclination of said switch to the horizontal.

2. A motor vehicle braking system comprising a fluid pressure motor having a pressure responsive unit, a master cylinder having a plunger connected to said pressure responsive unit for displacing fluid under pressure to wheel cylinders of the vehicle, a control valve mechanism for said motor having connection with sources of relatively high and low pressures, means including a fluid line connecting said valve mechanism to said motor, a normally open valve in said line, a solenoid connected to said valve and energizable to close it, a circuit for said solenoid including an inertia switch normally inclined upwardly and forwardly of the vehicle and having an inertia responsive conducting body therein movable forwardly in response to vehicle deceleration for closing said circuit, a pair of supports for said inertia switch at spaced points therealong, a windshield wiper having a control element, means connected between said control element and one of said supports to effect movement of the latter while the other support remains stationary, to reduce the angle to the horizontal of said inertia switch when said windshield wiper is turned on, and means for moving said other support vertically while said one support remains stationary, to change the angle to the horizontal of said inertia switch.

3. A system according to claim 2 wherein said means for vertically moving said other support comprises a dial, a pointer movable over said dial, and motion transmitting means connecting said pointer to said other support.

4. A system according to claim 2 wherein said means for vertically moving said other support comprises a dial mounted to be manually turned to different positions in accordance with one set of conditions, a pointer mounted to move over said dial, said dial having indicia indicating other conditions, means mechanically connecting said pointer to said other support to move it vertically upon movement of said pointer, and means tending to prevent movement of said dial relative to said pointer whereby, when said dial is turned, said pointer will be turned therewith.

5. A system according to claim 2 wherein said means for vertically moving said other support comprises a dial mounted to be manually turned to different positions in accordance with one set of conditions, a pointer mounted to move over said dial, said dial having indicia indicating other conditions, means mechanically connecting said pointer to said other support to move it vertically upon movement of said pointer, first detent means tending to hold said dial in selected positions, and second detent means tending to hold said pointer against movement over said dial whereby said pointer is movable relative to said dial to move said other support and movement of said dial transmits movement through said second detent means to move said pointer to effect vertical movement of said other support.

6. A braking system for a motor vehicle having a plurality of sets of wheel cylinders, comprising a pair of fluid pressure motor units each having a pressure responsive unit forming therewith a control chamber, a master cylinder having a plunger therein connected to each pressure responsive unit, one master cylinder being connected to one set of wheel cylinders and the other being connected to the remaining wheel cylinders, a valve mechanism having fluid connection with high and low pressure sources and communicating with the variable pressure chambers of both motors, there being a fluid line to provide such communication between such valve mechanism and the variable pressure chamber of one motor, a normally open valve in said fluid line, a solenoid connected to such valve and energizable to close it, a circuit for said solenoid comprising a switch inclined upwardly and forwardly of the vehicle and having a conducting body therein movable forwardly by vehicle deceleration to close said circuit, a pair of supports for said switch at spaced points therealong, means for effecting vertical movement of one support while the other remains stationary, to change the angle of said switch to the horizontal, and means for vertically moving the other support while said one support remains stationary, to change the angle of said switch to the horizontal.

7. A braking system for a motor vehicle having a plurality of sets of wheel cylinders, comprising a pair of fluid pressure motor units each having a pressure responsive unit forming therewith a control chamber, a master cylinder having a plunger therein connected to each pressure responsive unit, one master cylinder being connected to one set of wheel cylinders and the other being connected to the remaining wheel cylinders, a valve mechanism having fluid connection with high and low pressure sources and communicating with the variable pressure chambers of both motors, there being a fluid line to provide such communication between such valve mechanism and the variable pressure chamber of one motor, a normally open valve in said fluid line, a solenoid connected to such valve and energizable to close it, a circuit for said solenoid comprising a switch inclined upwardly and forwardly of the vehicle and having a conducting body therein movable forwardly by vehicle deceleration to close said circuit, a pair of supports for said switch at spaced points therealong, a windshield wiper having a control handle, a mechanical connection between said control handle and one of said supports to transmit vertical movement thereto while the other support remains stationary, to reduce the angle to the horizontal of said switch, and means operable independently of said one support while the latter remains stationary, for vertically moving the other support to change the angle of said switch to the horizontal.

8. A braking system for a motor vehicle having a plurality of sets of wheel cylinders, comprising a pair of fluid pressure motor units each having a pressure responsive unit forming therewith a control chamber, a master cylinder having a plunger therein connected to each pressure responsive unit, one master cylinder being connected to one set of wheel cylinders and the other being connected to the remaining wheel cylinders, a valve mechanism having fluid connection with high and low pressure sources and communicating with the variable pressure chambers of both motors, there being a fluid line to provide such communication between such valve mechanism and the variable pressure chamber of one motor, a normally open valve in said fluid line, a solenoid connected to such valve and energizable to close it, a circuit for said solenoid comprising a switch inclined upwardly and forwardly of the vehicle and having a conducting body therein movable forwardly by vehicle deceleration to close said circuit, a pair of supports for said switch at spaced points therealong, a windshield wiper having a control handle, a mechanical connection between said control handle and one of said supports to transmit vertical movement thereto while the other support remains stationary, to reduce the angle to the horizontal of said switch, a dial having indicia thereon indicating predetermined conditions, a pointer movable over said dial, and mechanical means connecting said pointer to said other support to move the latter vertically while said one support remains stationary, to change the angularity of said switch to the horizontal independently of the operation of said windshield wiper.

9. A system according to claim 8 wherein said dial is mounted to turn on a predetermined axis, a first detent means tending to hold said dial in pre-set positions while providing for turning movement thereof about said axis, said pointer being mounted to turn on said axis, and second detent means tending to hold said pointer in selected positions over said dial while providing for movement of said pointer over said dial, said second detent means serving to hold said pointer relative to said dial when the latter is turned on said axis to effect corresponding turning movement of said pointer to transmit vertical movement to said other support.

10. A braking system for a motor vehicle having a plurality of sets of wheel cylinders, comprising a pair of fluid pressure motor units each having a pressure responsive unit forming therewith a control chamber, a master cylinder having a plunger therein connected to each pressure responsive unit, one master cylinder being connected to one set of wheel cylinders and the other being connected to the remaining wheel cylinders, a valve mechanism having fluid connection with high and low pressure sources and communicating with the variable pressure chambers of both motors, there being a fluid line to provide such communication between such valve mechanism and the variable pressure chamber of one motor, a normally open valve in said fluid line, a solenoid connected to such valve and energizable to close it, a circuit for said solenoid comprising a switch inclined upwardly and forwardly of the vehicle and having a conducting body therein movable forwardly by vehicle deceleration to close said circuit, horizontal supports for said switch at spaced points therealong, means for moving one of said supports vertically while the other support remains stationary, to change the angularity of said switch to the horizontal, a dial, a pointer movable over said dial, a shaft to which said pointer is fixed, and mechanical means connecting said shaft to said other support to effect vertical movement thereof while said one support remains stationary, to change the inclination of said switch to the horizontal independently of said means for vertically moving said first support.

11. A system according to claim 10 provided with a stationary support in which said shaft is rotatable, said dial being rotatable on said shaft adjacent said stationary support, and means for transmitting rotary movement of said dial to said pointer whereby said shaft will be turned upon rotation of said dial to effect vertical movement of said other support.

12. A system according to claim 10 provided with a stationary support in which said shaft is rotatable, said dial being rotatable on said shaft adjacent said stationary support, means for transmitting rotary movement of said dial to said pointer whereby said shaft will be turned upon rotation of said dial to effect vertical movement of said other support, and means engaging said dial and tending to prevent rotation thereof whereby said pointer is movable over said dial while the latter remains stationary.

13. A system according to claim 10 provided with a stationary support in which said shaft is rotatable, said dial being rotatable on such shaft adjacent said stationary support, said dial being provided with circumferentially arranged notches, said pointer having a detent selectively engageable in said notches whereby turning movement of said dial will move said pointer to effect vertical movement of said other support, and detent means connected between said stationary support and said dial and tending to prevent rotation of said dial whereby said pointer is movable over said dial while the latter remains stationary, to effect vertical movement of said other support.

14. A braking system for a motor vehicle having a plurality of sets of wheel cylinders, comprising a pair of fluid pressure motor units each having a pressure responsive unit forming therewith a control chamber, a master cylinder having a plunger therein connected to each pressure responsive unit, one master cylinder being connected to one set of wheel cylinders and the other being connected to the remaining wheel cylinders, a valve mechanism having fluid connection with high and low pressure sources and communicating with the variable pressure chambers of both motors, a brake pedal, and means connecting said brake pedal to said valve mechanism to operate it and connecting said brake pedal to the pressure responsive unit of one motor to assist the pressure responsive unit therein in operating its associated master cylinder plunger, there being a fluid line to provide communication between said valve mechanism and the variable pressure chamber of the other motor, a normally open valve in said fluid line, a solenoid connected to such valve and energizable to close it, a circuit for said solenoid comprising a switch inclined upwardly and forwardly of the vehicle and having an inertia responsive conducting body therein movable forwardly by vehicle deceleration to close said circuit, a pair of supports for said switch at spaced points therealong, means for effecting vertical movement of one support while the other remains stationary, to change the angle of said switch to the horizontal, and means for moving the other support while the first support remains stationary, to change the angle of said switch to the horizontal.

References Cited in the file of this patent
UNITED STATES PATENTS

| | | |
|---|---|---|
| 2,807,338 | Jankauskas | Sept. 24, 1957 |
| 2,845,147 | Hill | July 29, 1958 |
| 2,876,044 | Hill | Mar. 3, 1959 |